United States Patent
Nicholson

(10) Patent No.: US 9,728,142 B2
(45) Date of Patent: Aug. 8, 2017

(54) REDUCED BLUR, LOW FLICKER DISPLAY SYSTEM

(71) Applicant: CHRISTIE DIGITAL SYSTEMS USA, INC., Cypress, CA (US)

(72) Inventor: Stuart James Myron Nicholson, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 41 days.

(21) Appl. No.: 14/799,670

(22) Filed: Jul. 15, 2015

(65) Prior Publication Data

US 2017/0018232 A1    Jan. 19, 2017

(51) Int. Cl.
*G09G 3/34* (2006.01)
*G09G 3/00* (2006.01)
(Continued)

(52) U.S. Cl.
CPC .......... *G09G 3/3406* (2013.01); *G09G 3/002* (2013.01); *G09G 3/003* (2013.01); *G09G 3/2014* (2013.01);
(Continued)

(58) Field of Classification Search
CPC ..... G09G 2320/0247; G09G 2320/064; G09G 2320/0653; G09G 3/002; G09G 3/003;
(Continued)

(56) References Cited

U.S. PATENT DOCUMENTS

| | | | | |
|---|---|---|---|---|
| 6,388,661 B1 * | 5/2002 | Richards | ................ | G09G 3/346 345/204 |
| 7,404,645 B2 * | 7/2008 | Margulis | ................ | G03B 21/20 348/630 |

(Continued)

FOREIGN PATENT DOCUMENTS

| | | |
|---|---|---|
| EP | 1845509 A1 | 10/2007 |
| JP | 2004252105 | 9/2004 |
| JP | 2006323234 | 11/2006 |

OTHER PUBLICATIONS

Extended European Search Report dated Jan. 26, 2017 for European Patent Application No. 16177380.9.

(Continued)

*Primary Examiner* — Amare Mengistu
*Assistant Examiner* — Jennifer Zubajlo
(74) *Attorney, Agent, or Firm* — Perry + Currier, Inc.

(57) ABSTRACT

A reduced blur, low flicker display system is provided, comprising: a display device comprising an array of pixel devices, each configured to be driven to a given output intensity value by changing each of the pixel devices between at least two intensity values within an image frame, including: a first intensity value and a second intensity value, higher than the first intensity value; and, a computing device configured to: spatially drive the pixel devices, according to image frames of image data, on a pixel-by-pixel basis and independent of one another, to respective output intensity values, according to at least two different spatio-temporal driving modes within a same image frame, a first set of the (Continued)

6-I

6-II

6-III

6-IV

6-V pixel devices driven according to a first spatio-temporal driving mode, and a second set of the pixel devices driven according to a second spatio-temporal driving mode, each within the same image frame.

16 Claims, 10 Drawing Sheets

(51) Int. Cl.
  *G09G 3/20* (2006.01)
  *H04N 5/57* (2006.01)

(52) U.S. Cl.
  CPC ............. *G09G 3/2018* (2013.01); *H04N 5/57* (2013.01); *G09G 2310/0232* (2013.01); *G09G 2310/0237* (2013.01); *G09G 2310/08* (2013.01); *G09G 2320/0247* (2013.01); *G09G 2320/064* (2013.01); *G09G 2320/0653* (2013.01); *G09G 2320/103* (2013.01)

(58) Field of Classification Search
  CPC .. G09G 3/2014; G09G 3/2018; G09G 3/3406; G09G 2310/0232; G09G 2310/0237; G09G 2310/08; G09G 2320/103; H04N 5/57
  See application file for complete search history.

(56) References Cited

U.S. PATENT DOCUMENTS

| | | | | |
|---|---|---|---|---|
| 8,068,087 | B2* | 11/2011 | Feng | G09G 3/342 345/102 |
| 2005/0001812 | A1* | 1/2005 | Amundson | G02F 1/167 345/107 |
| 2006/0238723 | A1 | 10/2006 | El-Ghoroury | |
| 2007/0035707 | A1* | 2/2007 | Margulis | G03B 21/26 353/122 |
| 2007/0139449 | A1* | 6/2007 | Bergquist | G09G 3/3413 345/691 |
| 2010/0238203 | A1* | 9/2010 | Stroemer | G09G 3/3611 345/690 |
| 2010/0277514 | A1* | 11/2010 | Yeo | G09G 3/3426 345/690 |
| 2012/0081419 | A1* | 4/2012 | Abe | G09G 3/3426 345/691 |
| 2012/0154462 | A1* | 6/2012 | Hempson | G09G 3/342 345/691 |
| 2014/0015870 | A1* | 1/2014 | Takahashi | G09G 3/3611 345/691 |
| 2015/0338631 | A1* | 11/2015 | Matsumoto | G02B 21/082 359/316 |

OTHER PUBLICATIONS

Partial European Search Report dated Nov. 22, 2016 for European Patent Application No. 16177380.9.

* cited by examiner

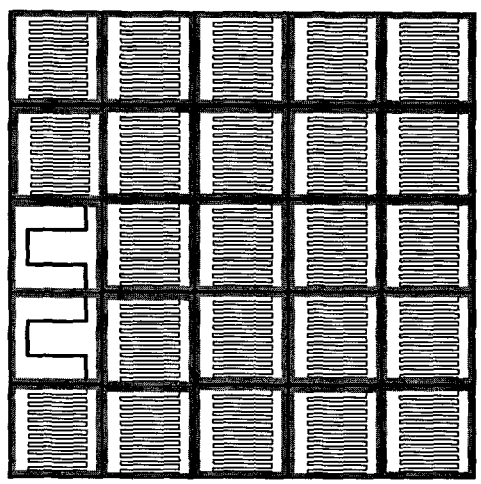
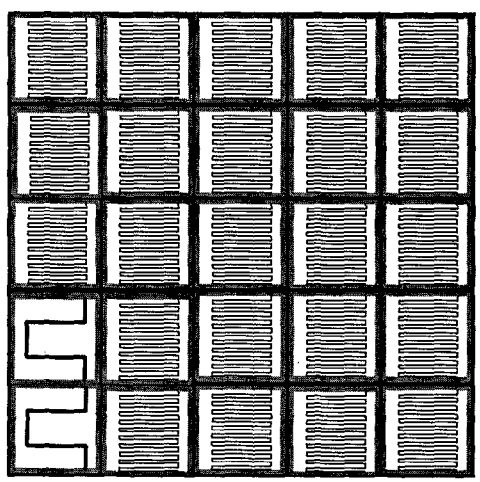
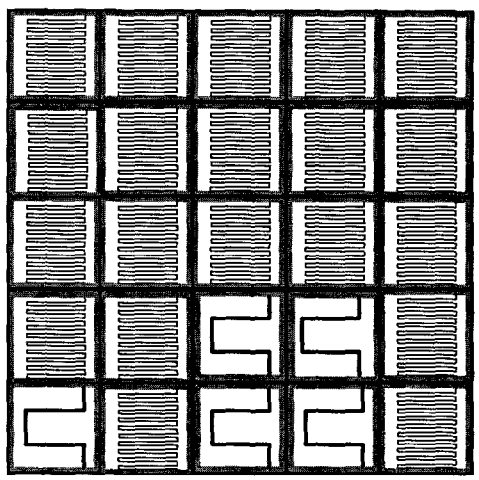
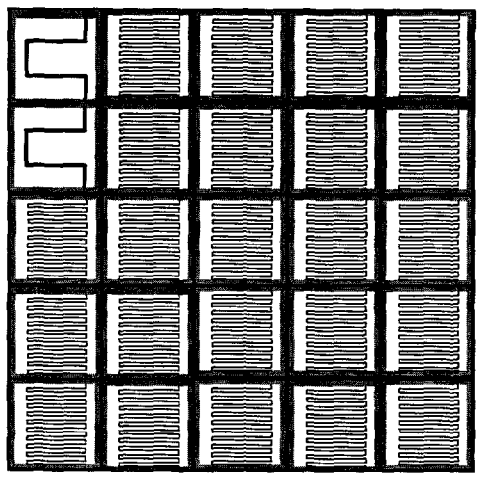
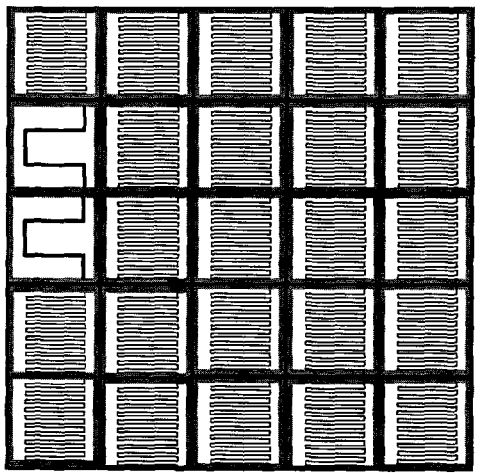
Fig. 6

REDUCED BLUR, LOW FLICKER DISPLAY SYSTEM

FIELD

The specification relates generally to display systems, and specifically to a reduced blur, low flicker display system.

BACKGROUND

Most display technologies fool a viewer's human visual system (HVS) into perceiving moving images by showing a rapid succession of static images (e.g. provided in frames) with slight changes between the images. The viewer's eyes will begin to track features in the image that are changing from frame to frame. The tracking typically takes the form of smooth pursuit, where the viewer's eyes follow the approximate path of the object. Because the actual object motion is periodic (e.g. an object only changes positions when one frame is removed and the next displayed), each element within the image is blurred in the direction of motion. The amount of blur is proportional to the time the object is displayed and the speed of the eye motion (which typically matches the speed of the object motion).

Most display technologies also build up each image (frame) over the frame period using successive flashes of light. These flashes may be of varying intensity, varying color and of varying duration. The parameters of the light flashes are controlled by the display (and/or by a computing device controlling the display) to construct the desired brightness and color of each image element (pixel). Where the flashes are closely spaced the viewer perceives blocks of continuous light but for pixels with less than maximum intensity there may be a gap with no light before, after and even within the main block of light. When the gaps are before and after the light, the image can appear to flicker at the frame rate. For common displays operating below 75 Hz frame rate (for example, at 24, 30, 50 or 60 Hz) this can fall below the flicker fusion threshold of the viewer, resulting in flicker artifacts.

One solution to the problem of blur is to display each image for a shorter period of time. Unfortunately, reducing display time reduces display brightness and tends to create a flicker artifact perceivable by the viewer when the frame rate is below the viewer flicker fusion threshold. Common displays operating below 75 Hz (for example, at 24, 30, 50 or 60 Hz) would suffer from this problem without the adoption of multi-flash or multi-draw approaches.

Another solution to the problem of blur is to filter the incoming image into two or more images and then display each image for a shorter period of time. Moving object detail is typically displayed for a much shorter time. Unfortunately, filtering the incoming image to detect motion introduces additional latency and the reduced display time of the detail frames can introduce other artifacts such as brightness variations.

Another solution to the problem of flicker at low frame rates is to use multi-flash and/or multi-draw approaches. Multi-flash (multi-draw) technologies reduce the risk of viewers perceiving flicker artifacts by breaking the block(s) of light used to build (draw) the image into more than one block (flash). This pushes the flicker frequency to at least twice the frame rate, well beyond the typical human flicker fusion threshold. Unfortunately, multi-flash/multi-draw displays introduce a multi-draw artifact when the viewer is tracking moving objects within the image. Instead of simply blurring, objects appear to multiply in the direction of motion. For example, one tower can appear to become two towers, the letter V can appear to be the letter W, etc.

Yet a further solution to both the problem of blur and flicker is to increase the frame rate. Unfortunately, increasing frame rate requires additional image data to improve blur (otherwise it is simply multi-draw), and this additional image data requires either: a. interpolation between frames, which adds latency to the display and also exhibits other artifacts such as improper interpolation (algorithms misinterpret which objects are moving where) and improper reveal (algorithms replace moved objects with incorrect background images); or b. investment in additional data capture/processing/playback/generation equipment such as cameras or rendering computers.

SUMMARY

In general, this disclosure is directed to a reduced blur low flicker display system, in which pixel devices in a display device are controlled, independent of one another, according to at least two different spatio-temporal driving modes. In some instances, the mode used is based on whether a pixel device is displaying a moving portion of an image or a relatively static portion of the image. If moving, a single-draw mode and/or a single-flash mode is used; if static a multi-draw and/or multi-flash mode is used. Determining whether portions of an image correspond to moving or relatively static portions can be based on comparing image frames, on a pixel-by-pixel basis, and determining whether differences in pixel properties, such as RGB (red-green-blue) levels, meet a threshold condition. For digitally driven display devices, such different spatio-temporal driving modes can correspond to different pulsed width modulation ("PWM") modes. However, for analog driven display devices modes similar to PWM can be used. Decisions about whether to drive pixel devices according to different spatio-temporal driving modes can also be based on whether the pixel devices are located in an image blend zone, or not, for example when the pixel devices are part of a display device in a multi-projector system. While the reduced blur low flicker display system described herein can presently be applied to digital multi-mirror (DMD) type devices, which use PWM-type driving (e.g. in projectors), increasingly display devices used in televisions, such as organic light emitting diode (OLED) displays and liquid crystal displays (LCDs), are being driven using PWM; hence techniques described herein can also be applied to such display devices.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides a display system comprising: a display device comprising an array of pixel devices, each of the pixel devices configured to be driven to a given output intensity value by changing each of the pixel devices between at least two intensity values within an image frame, the at least two intensity values including: a first intensity value and a second intensity value, the second intensity value higher than the first intensity value; and, a computing device configured to: spatially drive the pixel devices, according to image frames of image data, on a pixel-by-pixel basis and independent of one another, to respective output intensity values, according to at least two different spatio-temporal driving modes within a same image frame, a first set of the pixel devices driven according to a first spatio-temporal driving mode within the same image frame, and a second set of the pixel devices driven according to a second spatio-temporal driving mode within the same image frame.

The at least two different spatio-temporal driving modes can each comprise a respective pulsed width modulation ("PWM") mode.

The computing device can be further configured to spatially drive the pixel devices based on data from an input channel received with the image data.

The first set of the pixel devices can be associated with moving portions of the image data, and the first spatio-temporal driving mode can comprise one or more of a single-draw mode and a single-flash mode, and the second set of the pixel devices can be associated with static portions of the image data, and the second spatio-temporal driving mode can comprise one or more of a multi-draw mode and a multi-flash mode.

The computing device can be further configured to spatially drive the pixel devices based on comparing a current image frame to at least one previous image frame, on a pixel-by-pixel basis.

The computing device can be further configured to: compare current pixel values in a current image frame to previous pixel values of at least one previous image frame, on a pixel-by-pixel basis; determine the first set of the pixel devices when respective changes between respective current pixel values and respective previous pixel values meet a threshold condition; and, determine the second set of the pixel devices when the respective changes between the respective current pixel values and the respective previous pixel values are do not meet the threshold condition. Meeting the threshold condition can comprise a respective change being one or more of: being above a threshold pixel value change; and being indicative of motion occurring at a respective pixel.

The computing device can be further configured to control respective pixels at the pixel devices adjacent the first set of the pixel devices to the first spatio-temporal driving mode.

The computing device can be further configured to determine the first set of the pixel devices and the second set of the pixel devices based on whether respective pixel devices are located in an image blend zone.

The computing device can be further configured to receive the image data, comprising the image frames, from one or more of a memory and an external image source.

A further aspect of the specification provides a method comprising: at a display system comprising a computing device and a display device comprising an array of pixel devices, each of the pixel devices configured to be driven to a given output intensity value by changing each of the pixel devices between at least two intensity values within an image frame, the at least two intensity values including: a first intensity value and a second intensity value, the second intensity value higher than the first intensity value, spatially driving, using the computing device, the pixel devices, according to image frames of image data, on a pixel-by-pixel basis and independent of one another, to respective output intensity values, according to at least two different spatio-temporal driving modes within a same image frame, a first set of the pixel devices driven according to a first spatio-temporal driving mode within the same image frame, and a second set of the pixel devices driven according to a second spatio-temporal driving mode within the same image frame.

The at least two different spatio-temporal driving modes can each comprise a respective pulsed width modulation ("PWM") mode.

The method can further comprise spatially driving the pixel devices based on data from an input channel received with the image data.

The first set of the pixel devices can be associated with moving portions of the image data, and the first spatio-temporal driving mode can comprise one or more of a single-draw mode and a single-flash mode, and the second set of the pixel devices can be associated with static portions of the image data, and the second spatio-temporal driving mode can comprise one or more of a multi-draw mode and a multi-flash mode.

The method can further comprise spatially driving the pixel devices based on comparing a current image frame to at least one previous image frame, on a pixel-by-pixel basis.

The method can further comprise: comparing current pixel values in a current image frame to previous pixel values of at least one previous image frame, on a pixel-by-pixel basis; determining the first set of the pixel devices when respective changes between respective current pixel values and respective previous pixel values meet a threshold condition; and, determining the second set of the pixel devices when the respective changes between the respective current pixel values and the respective previous pixel values are do not meet the threshold condition. Meeting the threshold condition can comprise a respective change being one or more of: being above a threshold pixel value change; and being indicative of motion occurring at a respective pixel.

The method can further comprise controlling respective pixels at the pixel devices adjacent the first set of the pixel devices to the first spatio-temporal driving mode.

The method can further comprise determining the first set of the pixel devices and the second set of the pixel devices based on whether respective pixel devices are located in an image blend zone.

Yet a further aspect of the specification provides a computer-readable medium storing a computer program, wherein execution of the computer program is for: at a display system comprising a computing device and a display device comprising an array of pixel devices, each of the pixel devices configured to be driven to a given output intensity value by changing each of the pixel devices between at least two intensity values within an image frame, the at least two intensity values including: a first intensity value and a second intensity value, the second intensity value higher than the first intensity value, spatially driving, using the computing device, the pixel devices, according to image frames of image data, on a pixel-by-pixel basis and independent of one another, to respective output intensity values, according to at least two different spatio-temporal driving modes within a same image frame, a first set of the pixel devices driven according to a first spatio-temporal driving mode within the same image frame, and a second set of the pixel devices driven according to a second spatio-temporal driving mode within the same image frame. The computer-readable medium can comprise a non-transitory computer-readable medium.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 6 depicts a sequence of views of the display device of FIG. 1, as a moving object moves across a top of an image being rendered thereupon, according to non-limiting implementations.

DETAILED DESCRIPTION

Figure 1:
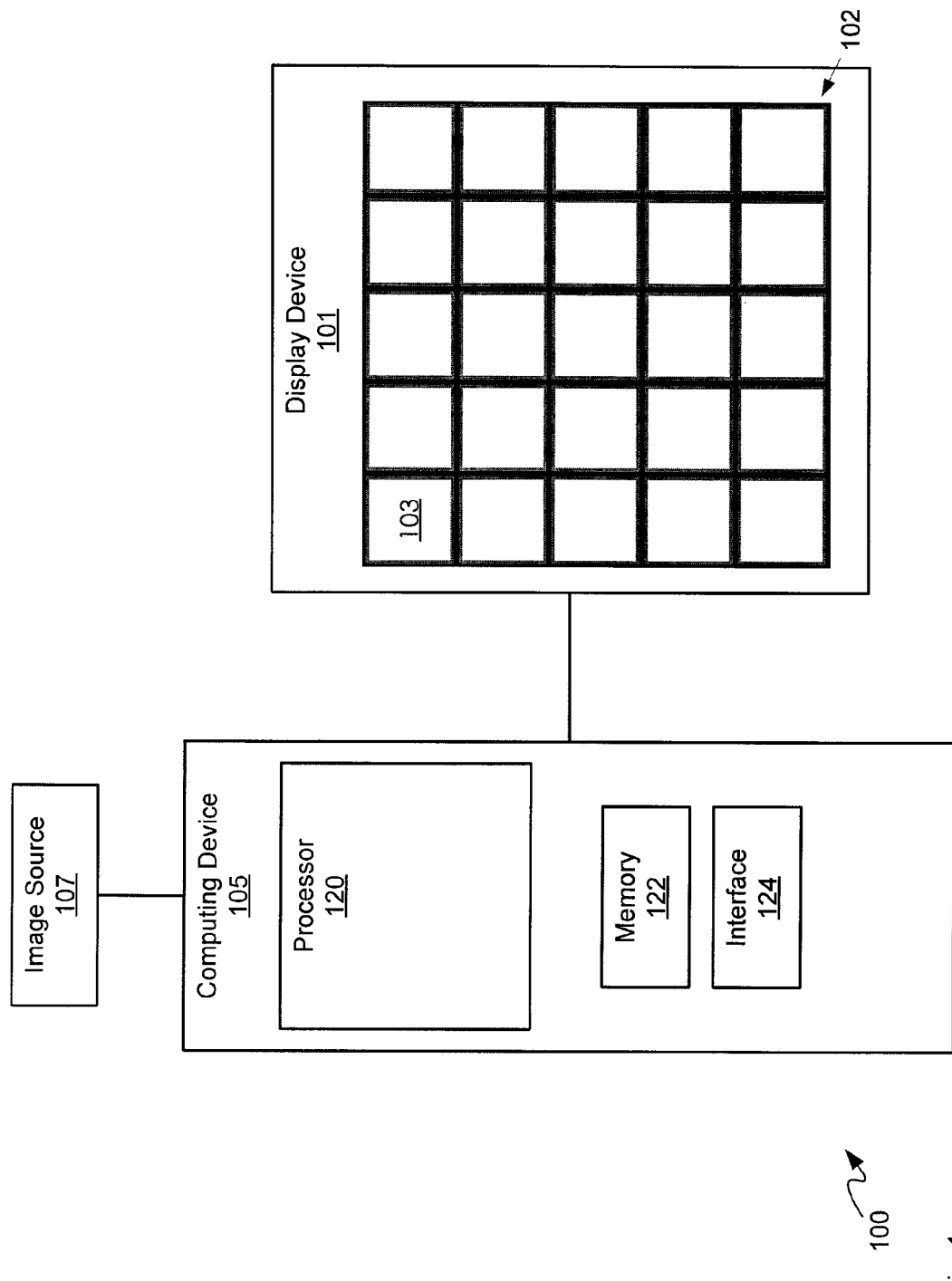
FIG. 1 depicts a reduced blur low flicker display system, according to non-limiting implementations.

FIG. 1 depicts a display system 100 comprising: a display device 101 comprising an array 102 of pixel devices 103 (only one of which is numbered in FIG. 1 for clarity), each of pixel devices 103 configured to be driven to a given output intensity value by changing each of pixel devices between at least two intensity values within an image frame, the at least two intensity values including: a first intensity value and a second intensity value, the second intensity value higher than the first intensity value; and, a computing device 105 configured to: spatially drive pixel devices 103, according to image frames of image data, on a pixel-by-pixel basis and independent of one another, to respective output intensity values, according to at least two different spatio-temporal driving modes within a same image frame, a first set of pixel devices 103 driven according to a first spatio-temporal driving mode within the same image frame, and a second set of pixel devices 103 driven according to a second spatio-temporal driving mode within the same image frame.

As depicted, system 100 further comprises an image source 107 which, in some implementations, can be combined with computing device 105. Image source 107 is generally configured to provide one or more image files to computing device 105 that defines output intensity values for each pixel in each frame of the one or more images. Image source 107 can be local or remote from computing device 105, in wireless and/or wired communication therewith, and can comprise a memory device storing image files, a broadcast device broadcasting image files, a media player that plays media storing image files (such as a DVD (digital versatile disc) player and/or a Bluray™ player and/or gaming device, etc.) and the like.

Furthermore, in other implementations computing device 105 and display device 101 are combined into one device, for example in a television device and the like, with images being received from image source 107 external to the television device. In other implementations, at least display device 101 can comprise a component of a projection system. Either way, it is appreciated that system 100 can comprise other components such as a chassis, one or more input devices, and the like that corresponding to mechanical functionality and/or electronic functionality of system 100, depending on specific implementations thereof.

Computing device 105 generally comprises a processor 120, a memory 122 and a communications interface 124 (interchangeably referred to hereafter as interface 124). Processor 120 can be implemented as a plurality of processors, including but not limited to one or more central processors (CPUs) and/or one or more graphical processing units (GPUs). Processor 120 can further comprise one or more hardware processors and/or an ASIC (application-specific integrated circuit) processor. Processor 120 is configured to communicate with memory 122 which can comprise a non-volatile storage unit (e.g. Erasable Electronic Programmable Read Only Memory ("EEPROM"), Flash Memory) and/or a volatile storage unit (e.g. random access memory ("RAM")). Programming instructions that implement the functional teachings of computing device 105, and/or system 100, as described herein can be maintained, persistently, in memory 122 and used by processor 120 which makes appropriate utilization of volatile storage during the execution of such programming instructions. Those skilled in the art will now recognize that memory 122 is an example of a computer-readable medium, and in particular a non-transitory computer-readable medium, storing a computer program, wherein execution of the computer program is for configuring the processor 120 as described herein. Furthermore, memory 122 is also an example of a memory unit and/or memory module.

In general, when processor 120 processes such instructions stored at memory 122, processor 120 is configured to: spatially drive pixel devices 103, according to image frames of image data, on a pixel-by-pixel basis and independent of one another, to respective output intensity values, according to at least two different spatio-temporal driving modes within a same image frame, a first set of pixel devices 103 driven according to a first spatio-temporal driving mode within the same image frame, and a second set of pixel devices 103 driven according to a second spatio-temporal driving mode within the same image frame.

Interface 124, can be implemented as one or more connectors and/or network adaptors and/or radios, configured to communicate in a wired and/or wireless manner with display device 101 (and image source 107 when present), for example using cables and/or one or more communication networks and/or one or more communication links and/or one or more communication buses. It will be appreciated that interface 124 can be configured to correspond with communication architecture that is used to implement cables and/or one or more communication networks and/or one or more communication links and/or one or more communication buses.

Display device 101 comprises one or more of a phase modulator, a light modulator, a reflective light modulator, a transmissive light modulator, a liquid crystal on silicon (LCOS) device, a liquid crystal display (LCD) device, and a digital micromirror device (DMD), an organic light emitting device (OLED), a light emitting diode (LED) device, and the like. Hence, each pixel device 103 comprises a device that corresponds to the technology of display device 101; for example, when display device 101 comprises a DMD, each of pixel devices 103 comprises a digital micromirror, switchable between an off-state (corresponding to a low and/or black intensity value and an on-state (corresponding to an high and/or red and/or green and/or blue and/or white, and the like, intensity value). Similarly, when display device 101 comprises an LCD, each of pixel devices 103 comprises a liquid crystal shutter disposed in front of a backlight, each of the liquid crystal shutters switchable between a first intensity value and a second intensity value. Furthermore display device 101 can comprise a digital display device and/or an analog display device.

While not depicted, display device 101 can include a light source which produces light that is modulated by pixel devices 103. Alternatively, each of pixel devices 103 can be inherently light emitting, for example as occurs with OLEDS.

While array 102 of pixel devices 103 is depicted as a low resolution five-by-five array (i.e. twenty-five pixel devices 103), such a depiction is an example only and it will be understood by persons of skill in the art that array 102 can have a size and resolution commensurate with modern high-definition display devices including, but not limited to 4 k display devices, and the like; however, other sizes and resolutions of display devices are within the scope of present implementations.

In general, in present implementations, each of pixel devices 103 is driven, for example by computing device 105, between at least two intensity states (e.g. a first defined intensity value state and a second defined intensity value state, with an associated intensity of the second defined intensity value state being higher than a respective associated intensity of the first defined intensity value state) in order to achieve an output intensity value. For example, within a given frame of an image, a pixel device 103 can be driven between at least the two intensity value states in order to achieve the output intensity value, with relative amounts of time that a pixel device 103 is at each intensity value being dependent on the output intensity value as defined by an image file. Hence, the output intensity value is a time-average of the at least the two intensity value states. However, in further implementations, each of pixel devices 103 can be driven to three or more defined intensity states to achieve an output intensity value that is a time-average of the three or more defined intensity states.

Such a scheme in digitally driven devices is referred to as pulse width modulation ("PWM") and/or multi-level half toning. However the term PWM will be used hereafter. Different PWM modes can be used to drive pixel devices 103. For example, in a single-flash mode (which can be interchangeably referred to as a single-draw mode), times that a pixel device 103 spends at the higher intensity value state are grouped together, as much as possible (e.g. as determined by processing images), into a single pulse within a frame, and the like. Alternatively, in a multi-flash mode (which can be interchangeably referred to as a multi-draw mode), times that a pixel device 103 spends at the higher intensity value state are spread over a plurality of pulses within a frame, and the like. In each of these modes, however, each of the pulses, whether a single pulse or a plurality of pulses, have a similar maximum value corresponding to the higher intensity value state.

It is further appreciated that the terms "intensity value state" and "intensity value" are not meant to imply that pixel device 103 are emitting light, but rather that they are driven to intensity value states and/or intensity values that correspond to a given output intensity value. For example, a DMD device and/or an LCD device do not emit light, but can be driven to intensity value states and/or intensity values that modulate light, when present, to a given output intensity value.

In any event, in prior art devices, each pixel device in a display device is driven using the same driving mode. In other words, all pixel devices are driven to a single-flash and/or single-draw mode; or all pixel devices are driven to a multi-flash and/or multi-draw mode. The selected mode can depend on whether there are moving objects within a frame of an image, with a single-flash mode, and the like, being used for all pixel devices when there is a moving object in a frame (as determined by a threshold change in all the pixel devices), and a multi-flash mode, and the like, being used for all pixel devices when there is not a moving object in a frame (as also determined by threshold change in all the pixel devices).

Figure 2:
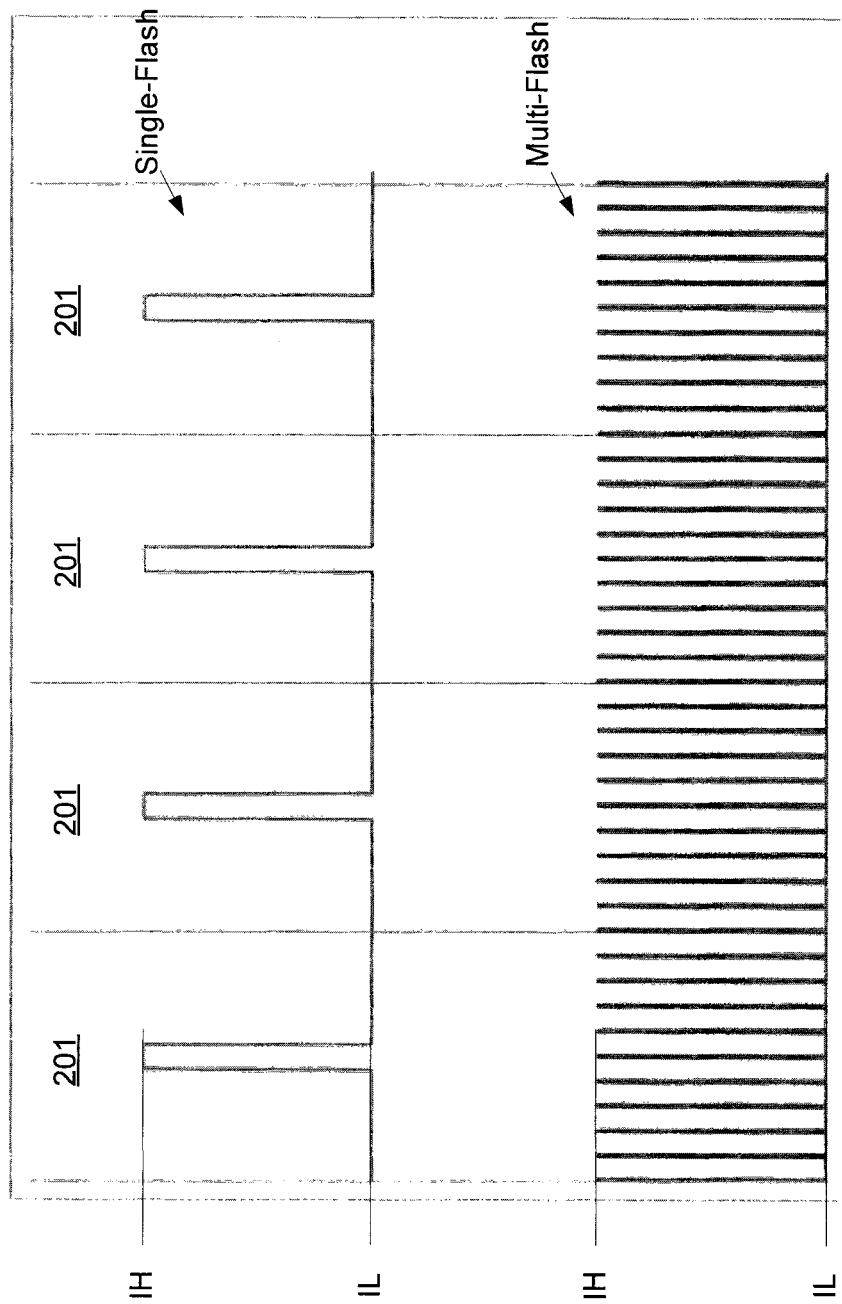
FIG. 2 depicts examples of a single-flash driving signal (top) and a multi-flash driving signal (bottom), according to non-limiting implementations.

For example, with reference to FIG. 2, which depicts example drive signals for a pixel device for each of a plurality of frames 201, in a single-flash mode (top portion of FIG. 2), each frame 201 comprises a single pulse with a height of "IH", which corresponds to a high intensity value, relative to low intensity value of "IL". However, in a multi-flash mode (bottom portion of FIG. 2), each frame 201 comprises a plurality of pulses with a height of "IH" relative to "IL", as depicted ten pulses per frame. Each of the pulses of the multi-flash mode has a time period of ⅒ of the pulse of the single-flash mode such that the cumulative time of the multi-flash mode is the same as the time of the single pulse of the single-flash mode. Hence, the light output will be the same for both modes over a given frame. Furthermore, in implementations where display device 101 is driven sequentially for RGB light sequences, each bit-plane is driven as depicted in FIG. 2. While the total duration of the pulses (e.g. the PWM) can be different can be different for each pixel device, depending on the output intensity, in the prior art all pixel devices for a given frame are driven according to the single-flash mode or the multi-flash mode.

For example, while operating in the single-flash mode blurring of moving objects in a displayed image can be reduced, but the single-flash mode can result in flicker artifacts in the remainder of the image, for example when the display device is operated at a frequency below a human flicker fusion threshold, for example about 75 Hz. While operating in the multi-flash mode blurring of the moving object occurs, but flicker artifacts are reduced in the remainder of the image, for example when the display device is operated at a frequency below a human flicker fusion threshold, for example about 75 Hz. Hence, prior art devices suffer from either blurring of moving objects and/or flickering, depending on which mode are being implemented at a given time.

To address this issue, pixel devices 103 of display device 101 are driven according to a function of both pixel intensity and a spatio-temporal mode that are each, in turn, a function of pixel position. Such a function can be expressed as f(x,y, Ixy, Mxy, t), such that a pixel device 103 at a position (x,y), as expressed in rectangular coordinates, and at a time, t, is driven to an intensity Ixy and a spatio-temporal mode Mxy (which, in some implementations, can be either multi-flash or single-flash). Further, a mode of each pixel device 103 is selected independent of modes of other pixel devices 103, as described hereafter.

Figure 3:
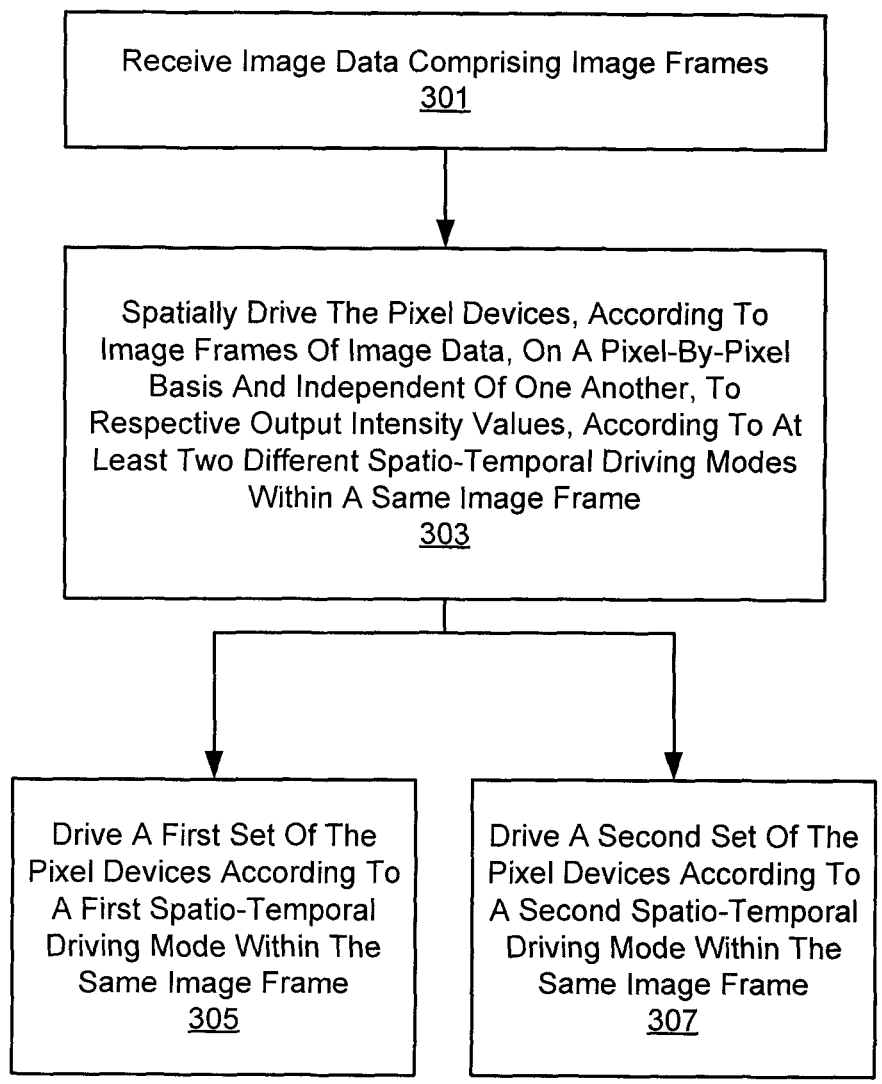
FIG. 3 depicts a schematic block diagram of a method of driving a display device according to different spatio-temporal modes, according to non-limiting implementations.

Attention is now directed to FIG. 3 which depicts a block diagram of a flowchart of a method 300 of operating a display system, according to non-limiting implementations. In order to assist in the explanation of method 300, it will be assumed that method 300 is performed using system 100, and specifically by computing device 105, for example when processor 120 processes instructions stored at memory 122. Indeed, method 300 is one way in which system 100 can be configured. Furthermore, the following discussion of method 300 will lead to a further understanding of system 100, and its various components. However, it is to be understood that system 100 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 100 as well.

At block 301, computing device 105 receives image data comprising image frames. For example, image data can be received from image source 107 and/or retrieved from memory 122.

At block 303, computing device 105 spatially drives pixel devices 103, according to image frames of the image data, on a pixel-by-pixel basis and independent of one another, to respective output intensity values, according to at least two different spatio-temporal driving modes within a same image frame. Specifically, at block 305, computing device 105 drives a first set of pixel devices 103 according to a first spatio-temporal driving mode within the same image frame and, at block 307 computing device 105 drives a second set of pixel devices 103 according to a second spatio-temporal driving mode within the same image frame. Blocks 303, 305 and 307 can occur simultaneously, and further each of blocks 305, 307 can comprise specific implementations of block 303. Further, blocks 303, 305 and 307 can be repeated for each image frame in the image data, on an on-going basis.

While method 300 can be applied to systems where selection of the first set of pixel devices 103 and the second set of pixel devices 103 occur according to other criteria, as described below, it is appreciated that method 300 can include implementations where the first set of pixel devices 103 and the second set of pixel device 103 are selected based on whether sets of pixel device 103 correspond to areas of image data that comprise moving objects, as determined by comparing a current frame with one or more previous frames on a pixel-by-pixel basis.

Figure 4:
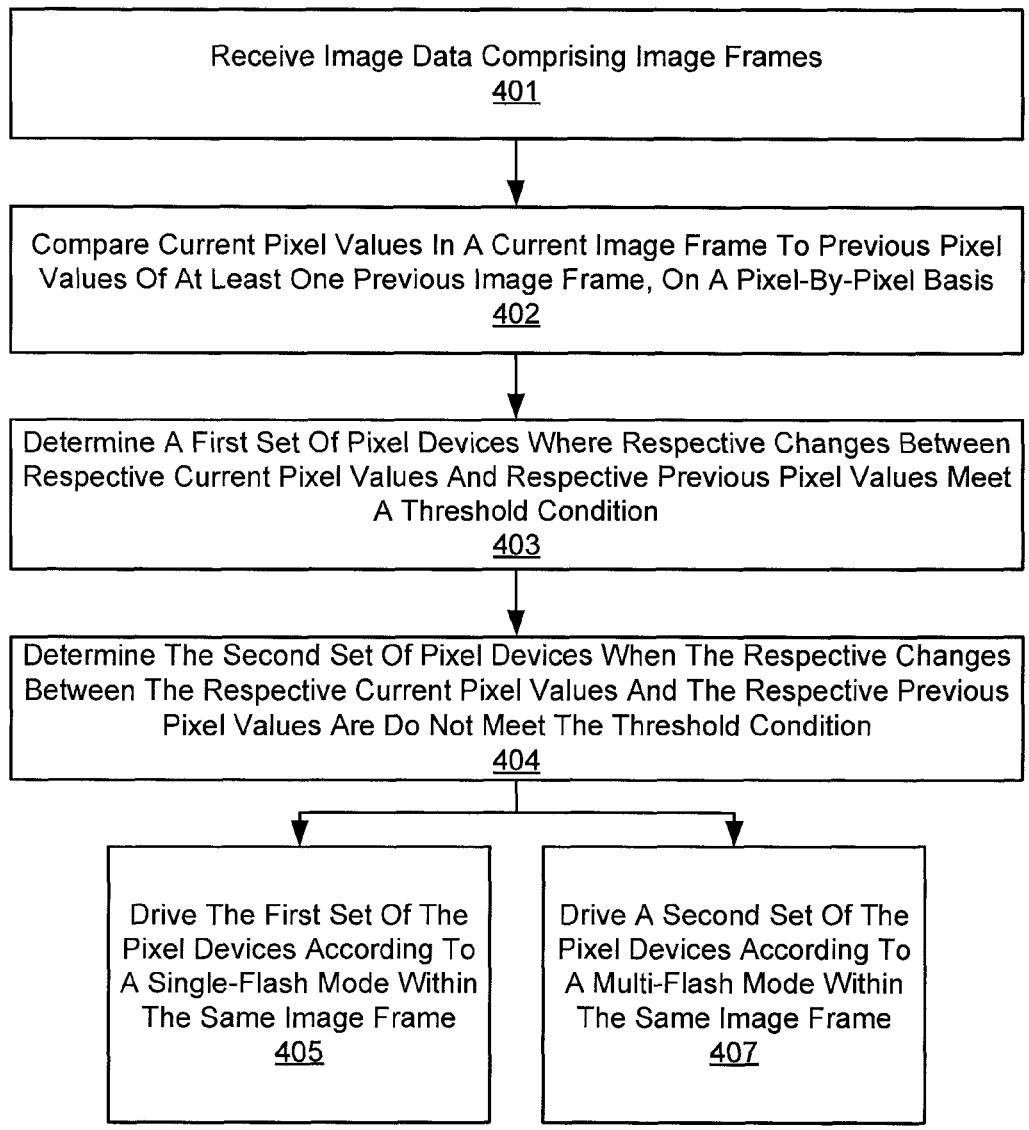
FIG. 4 depicts a schematic block diagram of a method of driving a display device according to different spatio-temporal modes, and specifically a single-flash mode and a multi-flash mode, according to non-limiting implementations.

For example, attention is now directed to FIG. 4 which depicts a block diagram of a flowchart of a method 400 of operating a display system, according to non-limiting implementations. In order to assist in the explanation of method 400, it will be assumed that method 400 is performed using system 100, and specifically by computing device 105, for example when processor 120 processes instructions stored at memory 122. Indeed, method 400 is one way in which system 100 can be configured. Furthermore, the following discussion of method 400 will lead to a further understanding of system 100, and its various components. However, it is to be understood that system 100 and/or method 400 can be varied, and need not work exactly as discussed herein in conjunction with each other, and that such variations are within the scope of present implementations.

Regardless, it is to be emphasized, that method 400 need not be performed in the exact sequence as shown, unless otherwise indicated; and likewise various blocks may be performed in parallel rather than in sequence; hence the elements of method 400 are referred to herein as "blocks" rather than "steps". It is also to be understood, however, that method 400 can be implemented on variations of system 100 as well.

Furthermore, it is appreciated that method 400 can comprise a special case of method 300, when method 300 is applied to images to remove blur and flicker artifacts.

At block 401, computing device 105 receives image data comprising image frames, as in block 301. For example, image data can be received from image source 107 and/or retrieved from memory 122.

At block 402, computing device 105 compares current pixel values in a current image frame to previous pixel values of at least one previous image frame, on a pixel-by-pixel basis.

At block 403, computing device 105 determines the first set of pixel devices 103 by selecting pixel devices 103 where respective changes between respective current pixel values and respective previous pixel values meet a threshold condition.

At block 404, computing device 105 determines the second set of pixel devices 103 by selecting pixel devices 105 where respective changes between respective current pixel values and respective previous pixel values do not meet a threshold condition.

At block 403, meeting the threshold condition can comprise a respective change being one or more of: being above a threshold pixel value change; and being indicative of motion occurring at a respective pixel. The changes can be based on changes in total pixel intensity and/or on colour-by-colour and/or bit-plane by bit-plane basis.

Similarly, at block 404, not meeting the threshold condition can comprise a respective change being one or more of: being less than the threshold pixel value change; and being indicative of display of static objects occurring at a respective pixel. The changes can be based on changes in total pixel intensity and/or on colour-by-colour and/or bit-plane by bit-plane basis.

Furthermore, the threshold condition can be adjusted for hysteresis in the pixel devices 103.

In general, the threshold condition can comprise a threshold change in intensity for a given pixel. For example, when an area of an image includes a moving object, a first frame can have high intensity value and the same pixel in an adjacent frame can have an intensity value that is lower than the first intensity value. Such threshold changes can be determined heuristically and configured at computing device 105, for example stored in memory 122.

At block 405, computing device 105 drives a first set of pixel devices 103 according to a single-flash mode within the same image frame and, at block 407 computing device 105 drives a second set of pixel devices 103 according to a multi-flash mode within the same image frame. Block 402 to 407 can occur simultaneously and further can be repeated for each image frame in the image data.

Figure 5:
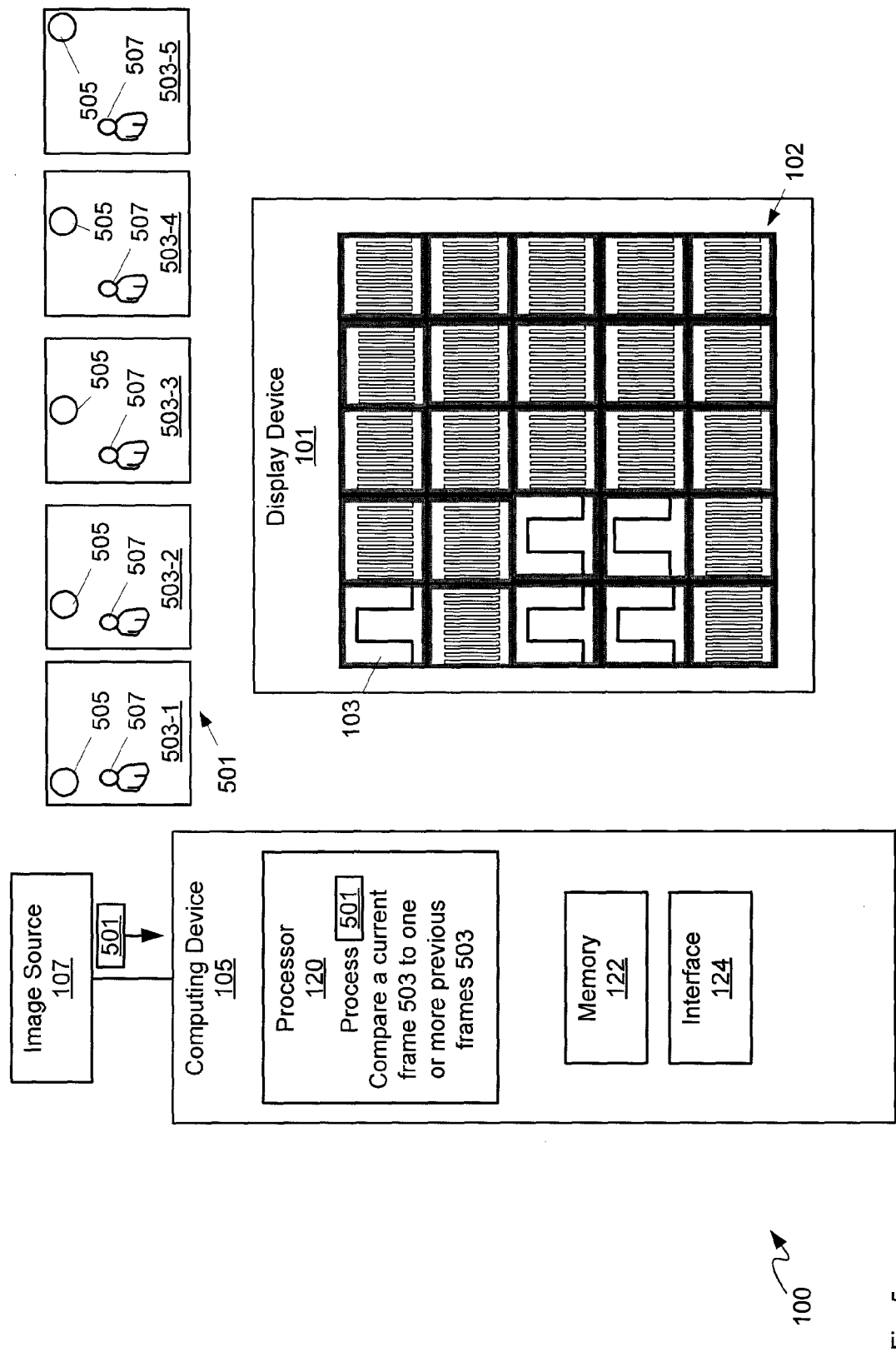
FIG. 5 depicts the system of FIG. 1 in which at least one pixel device of a display device is being driven according to a single-flash mode, while other pixel devices of the the display device are simultaneously being driven according to a multi-flash mode, according to non-limiting implementations.

Attention is next directed to FIG. 5, which is substantially similar to FIG. 1, with like elements having like numbers, and in which a non-limiting implementation of method 300 and method 400 are described.

In particular, FIG. 5 depicts computing device 105 receiving image data 501 from image source 107. Alternatively, image data 501 can be stored at memory 122, and/or an external memory; hence computing device 105 is further configured to receive image data 501, comprising image frames 503, as described hereafter, from one or more of a memory and an external image source.

In particular, FIG. 5 further depicts example frames 503-1, 503-2, 503-4, 503-5 of image data 501, frames 503-1, 503-2, 503-4, 503-5 interchangeably referred to hereafter, collectively, as frames 503 and, generically, as a frame 503. As depicted, frames 503 comprise a series of images that include a moving object 505 (e.g. the circle) in an upper area of frames 503 and a static object 507 (e.g. the person) in a central-left area of frames 503, with remaining areas of frames 503 including a background in the image. In particular object 505 moves across a top of the image over the five frames 503 that are depicted, from left to right.

It is further appreciated that frames 503 are simplified and show only a black and white version of images, and hence indicate only shades of grey and/or black/white spatial intensity data; however, in other implementations, frames 503 can comprise intensity data for primary colours, the combination of which result in a color image. Furthermore, for example purposes, frames 503, are depicted as having a finer resolution than the five-by-five array 102 of pixel devices 103, however in practise frames 503 and array 102 can have a same resolution and/or computing device 105 is configured to transform frames 503 to the resolution of array 102.

In any event, as depicted, processor 120 processes image data 501, for example by comparing a current frame 503 to one or more previous frames 503 and/or one or more other frames 503, to determine a first set of pixel devices 103 that include moving image data, and a second set of pixel devices 103 that do not include moving image data. In some implementations, for example, processor 120 can compare a current frame 503-1 with at least one later frame 503-2 to determine a first set of pixel devices 103 that include moving image data, and a second set of pixel devices 103 that do not include moving image data. Such a forward comparison can occur when current frame 503-1 is a first frame such that there are no previous frames with which to compare frame 503-1. Alternatively, processor 120 can determine that the entirety of a first frame 503-1 comprises moving data. In implementations where a current frame 503-2 is not a first frame, processor 120 can compare a current frame 503-2 with at least one previous frame 503-1 to determine a first set of pixel devices 103 that include moving image data, and a second set of pixel devices 103 that do not include moving image data. Either way, as depicted in FIG. 5, processor 120 determines that in first frame 503-1, moving object 505 is located in a top left corner, and hence determines that: the first set of pixel devices 103 that are used to render moving object 505 are located in the top left corner of array 102; and the second set of pixel devices 103 that are not used to render moving object 505 comprise the remainder of the pixel devices 103.

Hence, as depicted schematically in FIG. 5, the top left most pixel device 103 is driven using a single-flash mode, and the remainder of pixel devices 103 are driven using a multi-flash mode. Pixel devices 103 that are driven using the single-flash mode are indicated in FIG. 5 by a single pulse drawn on the pixel device 103; similarly, pixel devices 103 that are driven using the multi-flash mode are indicated in FIG. 5 by a plurality of pulses drawn on the pixel device 103.

Attention is next directed to FIG. 6 which depicts a simplified sequence of views 6-I, 6-II, 6-III, 6-IV, 6-V of array 102 as object 505 moves across the top row of frames 503. In particular, processor 120 determines a first set of pixel devices 103 that include moving object 505 (and/or all moving image data), and a second set of pixel devices 103 that do not include moving object 505 (and/or do not include moving image data). Hence, as moving object 505 moves across the top portion of frames 503, each pixel device 103 in the top row of array 102 is controlled to a single-flash mode when the moving object 505 is rendered thereby. For example, view 6-I corresponds to frame 503-1, view 6-II corresponds to frame 503-2, view 6-III corresponds to frame 503-3, view 6-IV corresponds to frame 503-4, and view 6-V corresponds to frame 503-5. In particular, in view 6-I, pixel devices 103 in a region corresponding to moving object 505 are controlled to be in a single-flash mode; furthermore, presuming that static object 507 has "appeared" in a frame, pixel devices 103 in a region corresponding to static object 507 are also controlled to be in a single-flash mode. The remaining pixel devices 103 are controlled to be in a multi-flash mode. In views 6-II, 6-III, 6-IV, 6-V (i.e. subsequent frames), static object 507 has not moved, so pixel devices 103 corresponding to static object 507 are also controlled to be in a multi-flash mode. Furthermore, in views 6-II, 6-III, 6-IV, 6-V, moving object 507 has moved so areas corresponding to the movement are controlled to be in the single-flash mode as moving object 507 moves across a top portion of frames 503.

While implementations heretofore have been described with respect to implementing method 300 with respect to moving image data, for example using the special case of method 400, in other implementations method 300 can be applied to other situations where controlling pixel devices 103 to different spatio-temporal modes is desired.

Figure 7:
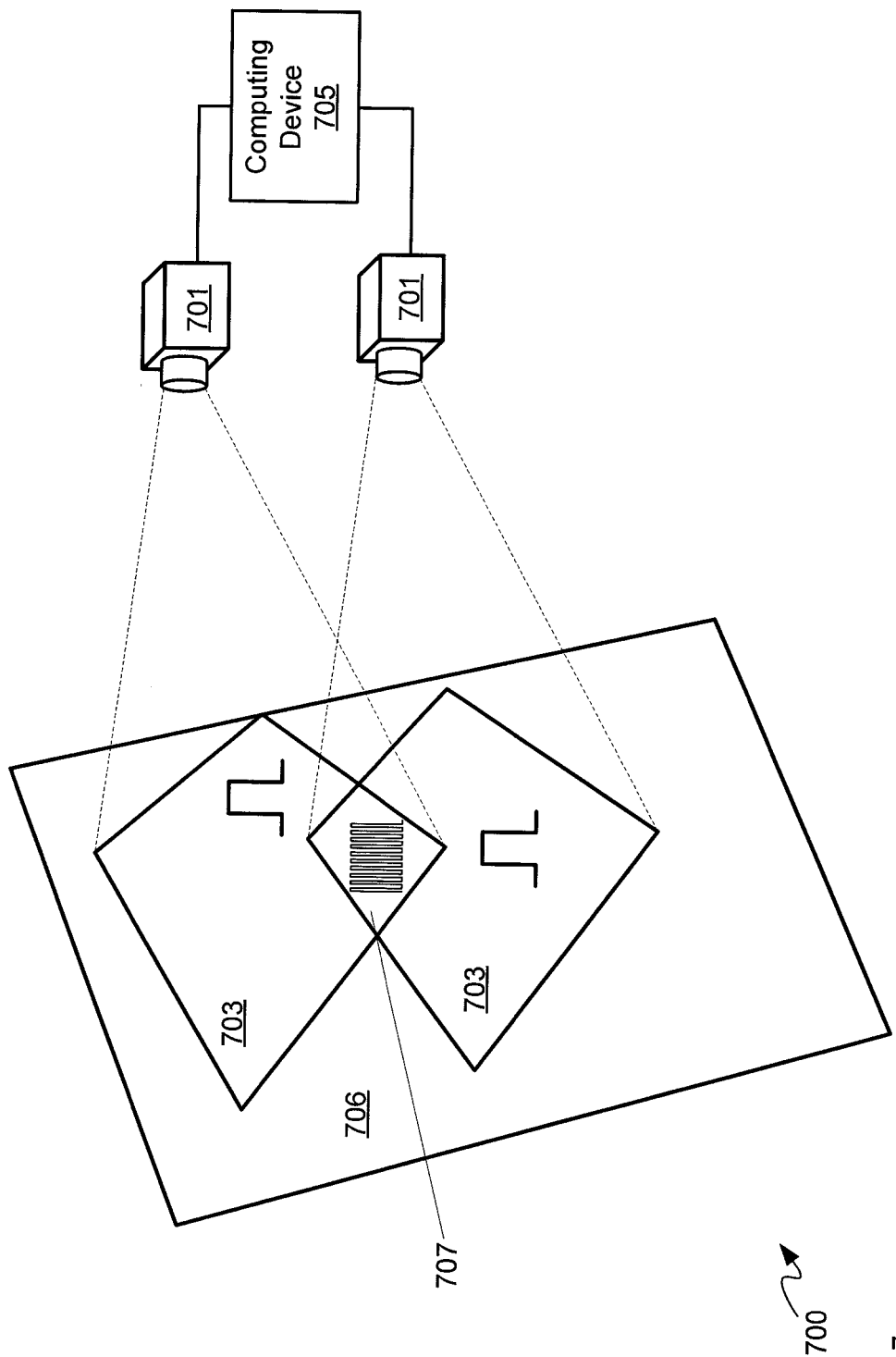
FIG. 7 depicts multi-projector display system in which different areas of display devices producing the projected images are driven according to different spatio-temporal modes, depending on whether the areas are associated with an image blend zone, according to non-limiting implementations.

For example, attention is next directed to FIG. 7 which depicts a system 700 comprising a plurality of projectors 701 projecting respective images 703 as controlled by a computing device 705, images 703 projected onto a screen 706. Images 703 overlap in an image blend zone 707, in which images 703 overlap and are blended together by projectors 701 and/or computing device 705 controlling projectors 701 to create a larger image. It is assumed in FIG. 7 that each projector 701 includes a display device that includes pixel devices, such as a DMD, used to modulate light to produce images 703 and that projectors 701 and/or computing device 705 controlling projectors 701 can determine which portions of images 703, received as image data, overlap based, for example, on a geometry of proctors 701 and/or screen 706.

In any event, pixel devices in projector that correspond to image blend zone 707, can be driven using a multi-flash mode, as indicated by the plurality of pulses in image blend zone 707 in FIG. 7; similarly, pixel devices in projector outside image blend zone 707, can be driven using a single-flash mode, as indicated by the single pulse in areas outside image blend zone 707 in FIG. 7. Hence, in method 300, a computing device can be configured to determine the first set of pixel devices and the second set of pixel devices based on whether respective pixel devices are located in an image blend zone.

Heretofore, implementations have been described in which a computing device that drives a display device receives image data and compares image frames and/or bit-planes of the image data to determine which pixel devices are to be driven according a given spatio-temporal mode. However, such a determination can alternatively be performed by a computing device that generates the image data and/or transmits the image data, the image data being encoded with an input channel that defines a spatio-temporal mode to be used to drive pixel devices, on a pixel-by-pixel basis. In other words, image data received by computing device 103 can have a format similar to f(x,y, Ixy, Mxy, t) as described above, which includes both spatio-temporal intensity data and spatio-temporal mode data (i.e. Mxy). In some implementations, one or more given bits of each pixel of the image data can be dedicated to encoding the spatio-temporal mode of the pixel. Hence, in these implementations, in method 300, a computing device is further configured to spatially drive pixel devices based on data from an input channel received with the image data.

Persons skilled in the art will appreciate that there are yet more alternative implementations and modifications possible. For example, in some implementations, a first set of pixel devices can be modified to include pixel devices adjacent the pixel devices that meet the threshold condition for being driven in a single-flash mode, for example to reduce artifacts in respective pixels at pixel devices adjacent the first set of pixel devices. For example, the first set of pixels can be determined to be comprise a moving object in an image being provided, and respective pixels at pixel devices adjacent the first set of pixel devices can be controlled to the same spatio-temporal driving mode as the first set of pixel devices. Furthermore, controlling of respective pixels at pixel devices adjacent the first set of pixel devices can occur in frames adjacent a current frame from which the first set is being determined. For example, decisions on which pixel devices to control could apply to frames adjacent a current frame: if pixels in the previous frame were determined to be moving, pixels in the current frame could be treated as if they were moving. Hence, "pixel devices adjacent the first set of pixel devices" is appreciated to include both pixel devices that are spatially adjacent the first set of pixel devices, and pixel devices that are temporally adjacent the first set of pixel devices. In particular, when it is determined, using method 300, that a given pixel device 103 is be controlled to be in a single-flash mode, as a moving object is displayed at the given pixel device 103 in a given frame, than for the next three frames (for example) the given pixel device 103 can also be controlled to be in the single-flash mode, though other numbers of frames are within the scope of present implementations.

Furthermore, selection of the first set and the second set can be based on an intensity of an image; for example, method 300 and/or method 400 can be performed only when intensity of pixels and/or an image is above a predetermined pixel intensity, for example, about 120 Hz, as the human vision system ("HVS") is more sensitive to flicker as intensity increases.

In yet further implementations, display systems provided herein can be configured to flash some pixel devices multiple times at reduced intensity (e.g. with gaps between flashes to reduce the pixel intensity) stretched over an entire frame period to raise refresh rate above an HVS flicker sensitivity threshold, while other pixel devices are flashed once over a portion of the frame to reduce smear/blur artifacts. In contrast to multi-sequence formatter implementations, where a length of both the single-flash and the multi-flash sequences are reduced to reduce high intensity pixel smear, in these implementations only the single-flash sequence is reduced, but the effective intensity of the pixel in the multi-flash sequence is reduced accordingly, thereby reducing the need for frame-wide black periods and the flicker they cause in the multi-flash image.

For example, in a 16 mS frame, for 75% light output, in a single-flash mode, an 8-bit pixel with a 100% intensity of 255 can have a single 12 mS pulse at maximum light output, with 4 mS of off-time to reduce blur when objects in a frame are moving; and for a multi-flash mode, 12 mS of light can be provided in multiple pulses, with sufficient gaps between the pulses to yield 12 mS of light, but spread evenly across the 16 mS, i.e. with 4 mS of "off" time, which increases the frequency for example above the HVS flicker sensitivity threshold. Hence, for different light outputs, in the single-flash mode, used for moving objects to reduce blur, the length of the single pulse can be changed relative to a length of a frame and, for the multi-flash mode, used for static/non-moving objects to reduce flicker, the number of pulses in a frame can be changed, as well as the "off" times there between. In particular, a number of pulses can be selected to move the flicker frequency to 120 Hz, or more, well above a HVS flicker sensitivity threshold, so humans won't see the flicker. A net result is that, in single-flash mode, "maximum" intensity moving pixels blur less because they are displayed for 12 mS instead of 16 mS (with the penalty that "maximum" intensity is now only 12/16 or 75% of the system capability) and "maximum" intensity stationary pixels don't flicker. A display time limit could be any value up to a frame period, not just 12 mS.

Figure 8:
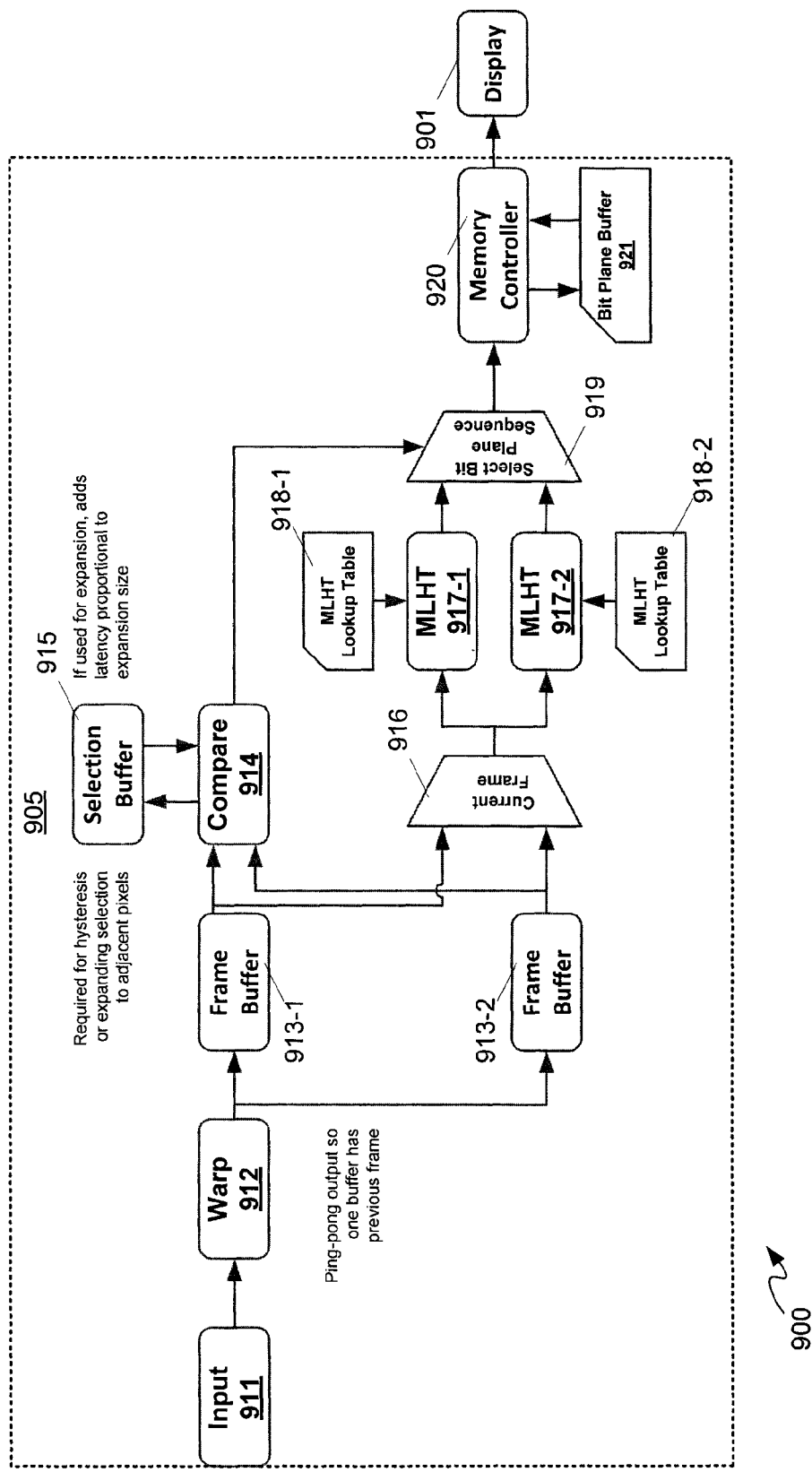
FIG. 8 depicts an alternative reduced blur low flicker display system, according to non-limiting implementations.

Attention is next directed to FIG. 8 which depicts an specific implementation of s system 900 configured to implement method 300, system 900 including a display device 901, which includes pixel devices (not depicted), and a computing device 905. Various software and hardware components of computing device 905 are also depicted, with software components implemented by a processor, a memory, a communication interface and/or a combination thereof; in other words, any software components of system 900 are implemented in associated hardware, such as a hardware processor. In other words, display device 901 and computing device 905 can each be respectively similar to display device 101 and computing device 105 described above.

Components of computing device 905 include an input 911, for example corresponding to interface 124, where image data is received, the image data including frames which can, in turn, include bit-planes that define colour intensities for producing a colour image.

Computing device 905 can include an optional warping unit 912 configured to warp the image data according to a given geometry, for example a geometry of a surface onto which image data is to be projected and/or displayed.

Computing device 905 further comprises at least two frame buffers 913-1, 913-2 each of which can buffer consecutive frames of image data, which can be compared using a compare unit 914, which is in communication with a selection buffer 915, where portions of frames can be stored for determining hysteresis of threshold conditions, and/or for expanding selection to adjacent pixels. If used for expanding selection to adjacent pixels, selection buffer 915 can add a latency proportional to an expansion size. For example, assuming in system 800 that any pixel within 3 pixels (in a box) of a "moving" pixel can also be defined as "moving". In general, data is processed as it arrives in a raster scan. Hence, for example, a first line can be processed to identify moving pixels, but further lines generally should be received and processed (e.g. second, third, fourth lines) before "moving/not moving" decisions occur for line 1. For example, when pixels on further lines are determined to be "moving", the same columns on the first line are generally determined to be "moving", and columns (e.g. on each line) within 3 pixels of those columns are also determined to be moving. Hence, for example, a 7×7 (3*2+1×3×2+1) box of "moving" pixels around any moving pixel results in (7−1)/2=3 lines of additional latency.

Compare unit 914 generally performs blocks 403, 404 of method 400 to determine which pixel devices of display device 901 correspond to areas of image data that include moving objects and the like. Alternatively, compare unit 914 can be used to determine which pixel devices of display device correspond to a blend zone, and the like.

In any event, computing device 905 further comprises a current frame selector 916 configured to select a current frame from frame buffers 913-1, 913-2, which is used to generate multi-level half tone (MLHT) frames 917-1, 917-2, one of MLHT frames 917-1, 917-2 including data for driving all pixel devices at display device 901 according to a single-flash mode, and the other of MLHT frames 917-1, 917-2 including data for driving all pixel devices at display device 901 according to a multi-flash mode. Further, each of MLHT frames 917-1, 917-2 can include bit-planes for driving the pixel devices in a respective mode, for example when the image data includes colour intensity data and/or bit-planes.

Each of MLHT frames 917-1, 917-2 can be generated from the current frame by using respective MLHT lookup tables 918-1, 918-2, which define data for driving pixel devices to different intensity levels (which can include colour intensity levels) using, respectively, the single-flash mode and the multi-flash mode; in other words, the data which populates each of MLHT frames 917-1, 917-2 is selected from respective MLHT lookup tables 918-1, 918-2 based on intensity levels from the current frame.

Computing device 905 further comprises a bit plane sequence selector 919 (and/or a frame portion selector) which receives each of the MLHT frames 917-1, 917-2, as well as data from compare unit 914 to combine portions of each of the MLHT frames 917-1, 917-2 to produce a combined MLHT frame used to drive pixel devices according to blocks 405, 407 of method 400.

In particular, in some implementations, system 900 can be configured to enforce block timing constraints and/or global timing constraints; as such, both of the single-flash and multi-flash MLHT frames 917-1, 917-2 can be configured to use the same timing, including, but not limited to, bit plane timing. For example, when display device 901 comprises a DMD, DMD timing is not random access and clears are group or global only.

Computing device 905 further comprises a memory controller 920, and a bit plane buffer 921, in communication with each other, with memory controller 920 configured to receive the combined MLHT frame from plane sequence selector 919, and drive display device 901 therewith. Bit plane buffer 921 is configured to store bit planes of the combined MLHT frame until they are used to drive display device 901.

Hence, in system 900, two MLHT frames for driving pixel devices of display device 901 according to two different spatio-temporal driving modes are produced, and then combined base on the output of compare unit 914.

Figure 9:
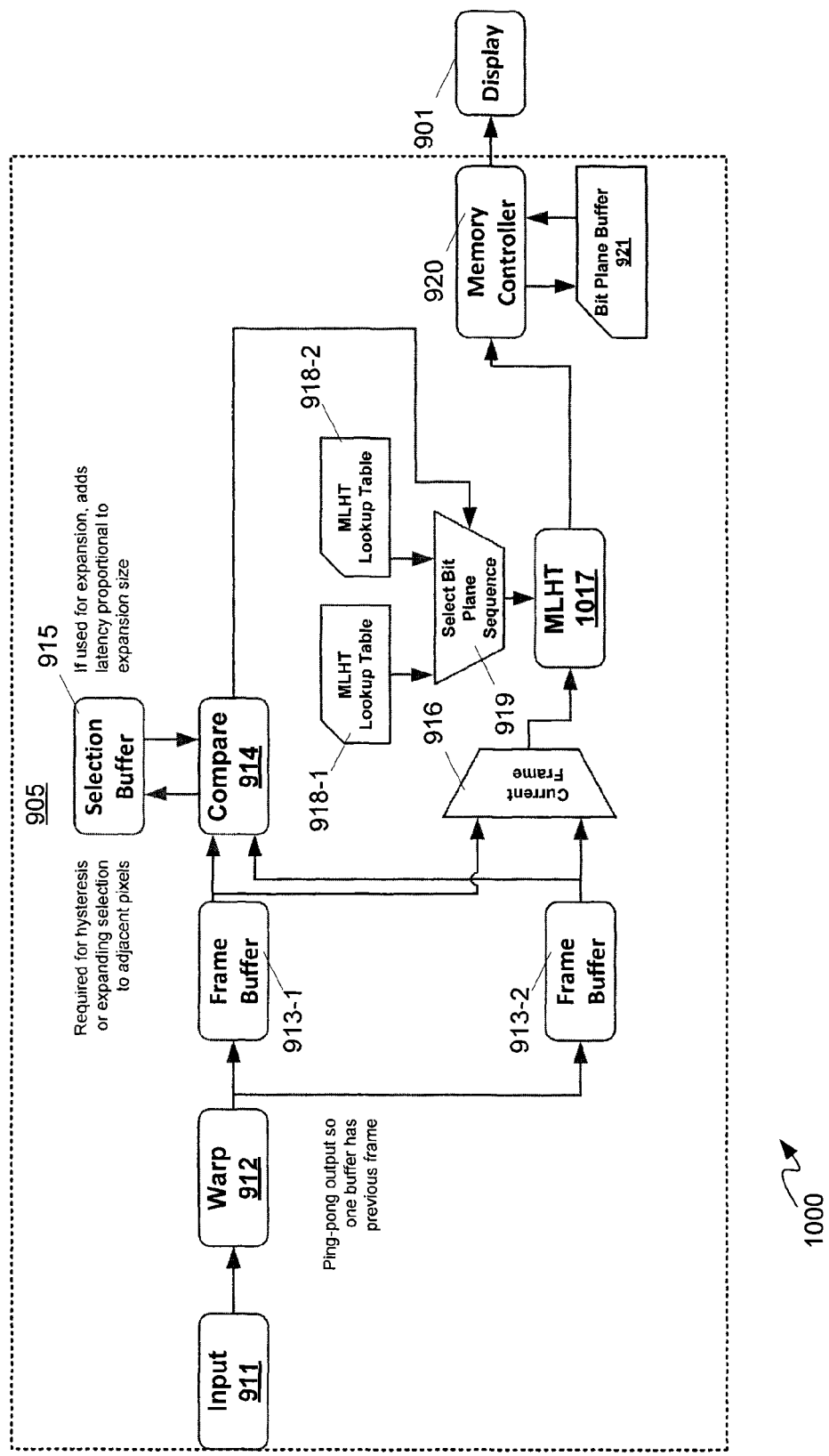
FIG. 9 depicts yet a further alternative reduced blur low flicker display system, according to non-limiting implementations.

Attention is next directed to FIG. 9 which depicts a system 1000 that is substantially similar to system 900, with like elements having like numbers. However, in these implementations, data from compare unit 914 is received at select bit plane sequencer 919, which uses respective MLHT lookup tables 918-1, 918-2 and the current frame to populate a single MHLT frame 1017 that is similar to the combined MLHT frame described above. As such, generation of intermediate MLHT frames 917-1, 917-2 is eliminated. System 1000 otherwise functions in a manner similar to system 900.

Figure 10:
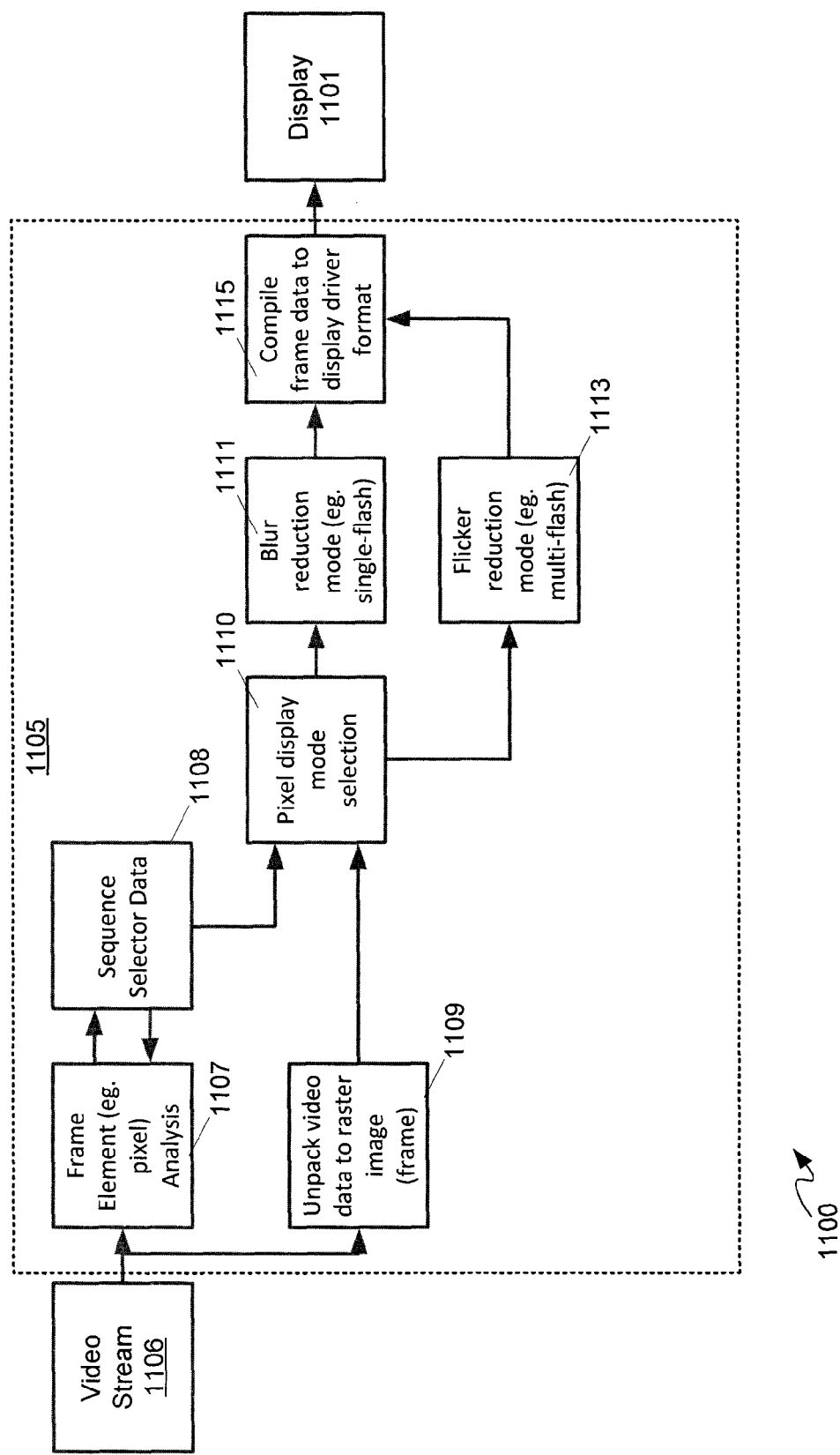
FIG. 10 depicts yet a further alternative reduced blur low flicker display system, according to non-limiting implementations.

Attention is next directed to FIG. 10 which depicts a system 1100, which schematically depicts functionality of systems 100, 900 and 1000 when the image data comprises a video stream. In particular, system 1100 comprises a display device 1101 and a computing device 1105. Various software and hardware components of computing device 1105 are also depicted, with software components implemented by a processor, a memory, a communication interface and/or a combination thereof. In other words, display device 1101 and computing device 1105 can each be respectively similar to display device 101 and computing device 105 described above.

Computing device 1105 receives a video stream 1106, for example from an image source, a memory and the like, and analyzes frame elements at a frame element analysis unit 1107, where sequence selector data is produced at component 1108 (e.g. to select which mode is to be used for each pixel device of display device 1101). Computing device 1101 further unpacks video data from video stream 1106 to a raster image at component 1109, and pixel display mode selector 1110 receives the raster image from component 1109, as well as selection data from component 1108 to determine, respectively, at components 1111, 1113 which pixel devices are to be operated in a single-flash mode (e.g. for blur reduction), and which pixel devices are to be operated in a multi-flash mode (e.g. for flicker reduction); components 1111, 1113 can generally output frame data, similar to MLHT frames 917-1, 917-2 and/or MLHT frame 1017. The frame data produced at components 1111, 1113 is compiled at component 1115 to a display driver format, which is used to drive display device 1101.

Persons skilled in the art will appreciate that there are yet more alternative implementations and modifications possible. For example, while present implications are described herein with reference to spatially driving pixel devices, in a same image frame according two different spatio-temporal driving modes within a same image frame, pixel devices can be spatially driven to at least two different spatio-temporal driving modes within a same image frame, including, but not limited to: three spatio-temporal driving modes within a same image frame, four spatio-temporal driving modes within a same image frame etc. Indeed, while only two different spatio-temporal driving modes are described, single-flash and multi-flash, other spatio-temporal driving modes are within the scope of present implementations, including modifications to the single-flash and multi-flash modes described herein that vary, for example, intensity of the pulses within the mode. In any event, pixel devices can be driven to a plurality of different spatio-temporal driving modes within a same image frame, for example to transition more smoothly between single-flash and multi- to reduce artifacts in an image.

Hence, the present specification provides a display system with reduced motion blur, which can be particularly useful for low frame rate displays, without requiring high frame rate content or introducing flicker artifacts. In some present implementations, pixel driving sequences transition from single-flash mode to a multi-flash mode to reduce flicker. Such a transition can occur at or below a predetermined pixel intensity to reduce flicker in dimmer portions of an image, and as the HVS is less sensitive to flicker as intensity decreases. This can result in improved image appearance while retaining the blur-reduction benefits of single-flash pixel sequences, and can be more effective as pixel intensity decreases.

Hence, present implementations can include multi-sequence formatters (e.g. a computing device) that is configured to control some pixel devices at a display device to flash multiple times per frame to raise refresh rate above HVS flicker sensitivity threshold, and control other pixel devices to flash once per frame to reduce smear/blur artifacts.

Sequence selection can be made based on one or more of: input channel (e.g. an alpha channel); and determining when a pixel intensity has changed sufficiently to indicate motion (for example as determined from a delta and/or change of any RGB pixel value exceeding a threshold value). In some implementations, hysteresis can occur. In other implementations, blurring can occur at adjacent pixels to avoid flashing artifacts that can flash an eye incorrectly to moving edges.

Where blur reduction is implemented at high intensity pixels both multi-flash and single-flash sequences can be shortened, at the expense of flicker, due to black periods.

Those skilled in the art will appreciate that in some implementations, the functionality of systems 100, 900, 1000, 1100 can be implemented using pre-programmed hardware or firmware elements (e.g., application specific integrated circuits (ASICs), electrically erasable programmable read-only memories (EEPROMs), etc.), or other related components. In other implementations, the functionality of systems 100, 900, 1000, 1100 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:
1. A display system comprising:
a display device comprising an array of pixel devices, each of the pixel devices configured to be driven to a given output intensity value by changing each of the pixel devices between at least two intensity values within an image frame, the at least two intensity values including: a first intensity value and a second intensity value, the second intensity value higher than the first intensity value; and,
a computing device configured to:
compare image frames of image data, on a pixel-by-pixel basis, to determine: a first set of the pixel devices that correspond to moving image data; and a second set of the pixel devices that corresponds to static image data;
spatially drive the pixel devices, on a pixel-by-pixel basis and independent of one another, to respective output intensity values, according to at least two different spatio-temporal driving modes within a same image frame, the first set of the pixel devices driven according to a first spatio-temporal driving mode within the same image frame, and the second set of the pixel devices driven according to a second spatio-temporal driving mode within the same image frame,
the first spatio-temporal driving mode comprising one or more of a single-pulse pulsed width modulation PWM mode, a single-draw mode, and a single-flash mode, and the second spatio-temporal driving mode comprising one or more of a multi-pulse PWM mode, a multi-draw mode, and a multi-flash mode, wherein the first set of the pixel devices and the second set of the pixel devices are adjacent one another.

2. The display system of claim 1, wherein the computing device is further configured to spatially drive the pixel devices based on data from an input channel received with the image data.

3. The display system of claim 1, wherein the computing device is further configured to spatially drive the pixel devices based on comparing a current image frame to at least one previous image frame, on a pixel-by-pixel basis.

4. The display system of claim 1, wherein the computing device is further configured to compare the image frames of the image data by: comparing current pixel values in a current image frame to previous pixel values of at least one previous image frame, on a pixel-by-pixel basis; determining the first set of the pixel devices when respective changes between respective current pixel values and respective previous pixel values meet a threshold condition; and, determining the second set of the pixel devices when the respective changes between the respective current pixel values and the respective previous pixel values are do not meet the threshold condition.

5. The display system of claim 4, wherein meeting the threshold condition comprises a respective change being one or more of: being above a threshold pixel value change; and being indicative of motion occurring at a respective pixel.

6. The display system of claim 1, wherein the computing device is further configured to control respective pixels at the pixel devices adjacent the first set of the pixel devices, other than the second set of pixel devices, to the first spatio-temporal driving mode.

7. The display system of claim 1, wherein the computing device is further configured to determine the first set of the pixel devices and the second set of the pixel devices based on whether respective pixel devices are located in an image blend zone.

8. The display system of claim 1, wherein the computing device is further configured to receive the image data, comprising the image frames, from one or more of a memory and an external image source.

9. A method comprising:
at a display system comprising a computing device and a display device comprising an array of pixel devices, each of the pixel devices configured to be driven to a given output intensity value by changing each of the pixel devices between at least two intensity values within an image frame, the at least two intensity values including: a first intensity value and a second intensity value, the second intensity value higher than the first intensity value,
comparing image frames of image data, on a pixel-by-pixel basis, to determine: a first set of the pixel devices that correspond to moving image data; and a second set of the pixel devices that corresponds to static image data;
spatially driving, using the computing device, the pixel devices, on a pixel-by-pixel basis and independent of one another, to respective output intensity values, according to at least two different spatio-temporal driving modes within a same image frame, the first set of the pixel devices driven according to a first spatio-temporal driving mode within the same image frame, and the second set of the pixel devices driven according to a second spatio-temporal driving mode within the same image frame,
the first spatio-temporal driving mode comprising one or more of a single-pulse pulsed width modulation PWM mode, a single-draw mode, and a single-flash mode, and the second spatio-temporal driving mode comprising one or more of a multi-pulse PWM mode, a multi-draw mode, and a multi-flash mode, wherein the first set of the pixel devices and the second set of the pixel devices are adjacent one another.

10. The method of claim 9, further comprising spatially driving the pixel devices based on data from an input channel received with the image data.

11. The method of claim 9, further comprising spatially driving the pixel devices based on comparing a current image frame to at least one previous image frame, on a pixel-by-pixel basis.

12. The method of claim 9, further comprising comparing the image frames of the image data by: comparing current pixel values in a current image frame to previous pixel values of at least one previous image frame, on a pixel-by-pixel basis; determining the first set of the pixel devices when respective changes between respective current pixel values and respective previous pixel values meet a threshold condition; and, determining the second set of the pixel devices when the respective changes between the respective current pixel values and the respective previous pixel values are do not meet the threshold condition.

13. The method of claim 12, wherein meeting the threshold condition comprises a respective change being one or more of: being above a threshold pixel value change; and being indicative of motion occurring at a respective pixel.

14. The method of claim 9, further comprising controlling respective pixels at the pixel devices adjacent the first set of the pixel devices, other than the second set of pixel devices, to the first spatio-temporal driving mode.

15. The method of claim 9, further comprising determining the first set of the pixel devices and the second set of the pixel devices based on whether respective pixel devices are located in an image blend zone.

16. A non-transitory computer-readable medium storing a computer program, wherein execution of the computer program is for:
at a display system comprising a computing device and a display device comprising an array of pixel devices, each of the pixel devices configured to be driven to a given output intensity value by changing each of the pixel devices between at least two intensity values within an image frame, the at least two intensity values including: a first intensity value and a second intensity value, the second intensity value higher than the first intensity value,
comparing image frames of image data, on a pixel-by-pixel basis, to determine: a first set of the pixel devices that correspond to moving image data; and a second set of the pixel devices that corresponds to static image data;
spatially driving, using the computing device, the pixel devices, on a pixel-by-pixel basis and independent of one another, to respective output intensity values, according to at least two different spatio-temporal driving modes within a same image frame, the first set of the pixel devices driven according to a first spatio-temporal driving mode within the same image frame, and the second set of the pixel devices driven according to a second spatio-temporal driving mode within the same image frame,
the first spatio-temporal driving mode comprising one or more of a single-pulse pulsed width modulation PWM mode, a single-draw mode, and a single-flash mode, and the second spatio-temporal driving mode comprising one or more of a multi-pulse PWM mode, a multi-draw mode, and a multi-flash mode, wherein the first set of the pixel devices and the second set of the pixel devices are adjacent one another.

* * * * *